United States Patent Office 3,446,334
Patented May 27, 1969

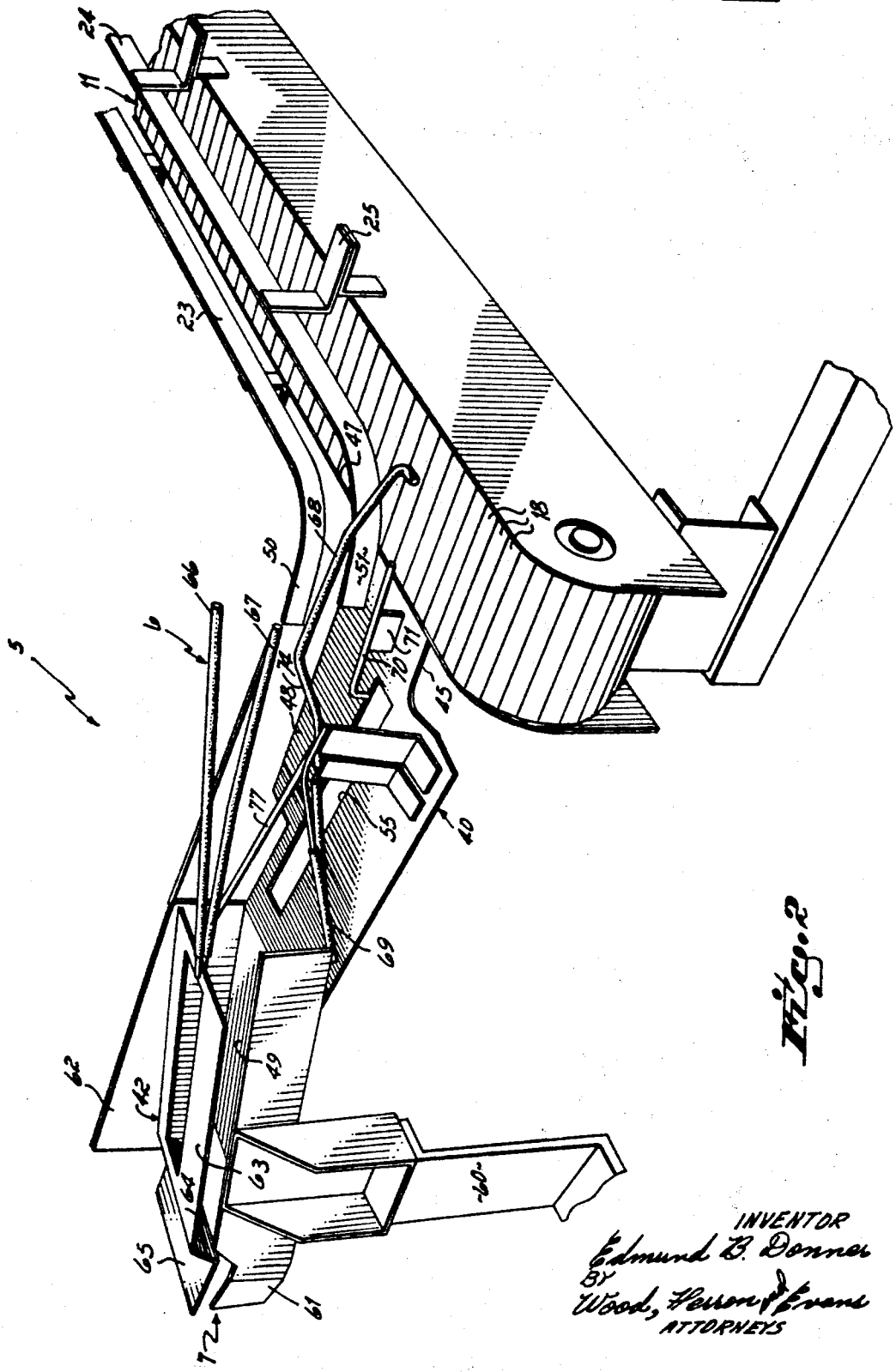

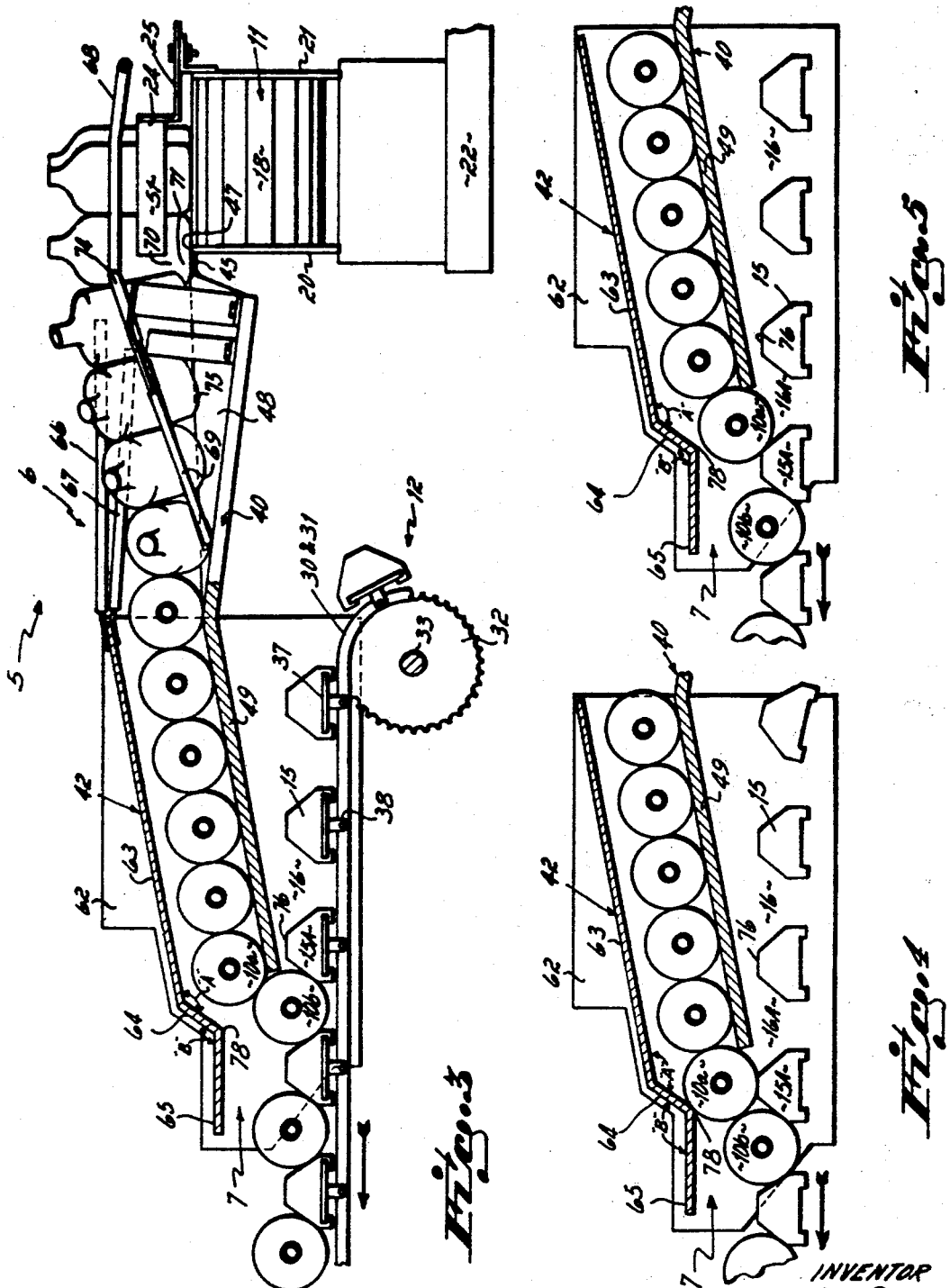

3,446,334
BOTTLE LETDOWN MECHANISM
Edmund B. Donner, Washington, Pa., assignor to Solar Engineering & Equipment Co., Beaver, Pa., a corporation of Pennsylvania
Filed Oct. 17, 1967, Ser. No. 675,856
Int. Cl. B65g 47/00, 47/24
U.S. Cl. 198—26                                    8 Claims

ABSTRACT OF THE DISCLOSURE

A mechanism for high speed transfer of bottles from a vertical to a horizontal position. The transfer is effected by a network of guide means including a series of rods to which a continuous stream of upstanding bottles is supplied and from which horizontally positioned bottles exit onto an output conveyor in a spaced stream.

*Cross-reference to related applications*

This invention is primarily intended for use in combination with glass bottle decorating machines of the type disclosed in my copending application Ser. No. 660,799, filed Aug. 15, 1967, for "Method and Apparatus for Decorating Ware." It should be appreciated, however, that the invention is equally applicable to reorienting bottles for processing in other types of machines.

*Background of the invention*

Bottles are customarily transported throughout a bottle manufacturing or processing plant while supported in vertical position. To decorate the bottles, they must be placed horizontally or on their sides. This entails reorientation of the bottles from a vertical to a horizontal position prior to insertion into a decorating machine and from a horizontal position to a vertical position after exit from the machine. Traditionally, this reorientation has been effected by allowing the bottles to drop off of the end of a first conveyor onto an oscillating cradle which lowers the bottles one at a time into a horizontal position on a decorating machine conveyor. One patent which illustrates this type of reorientation mechanism is U.S. Patent No. 2,721,516, issued Oct. 25, 1955, for "Work Supporting and Registering Apparatus for Bottle Decorating Machine."

As the operating speeds of glass bottle decorating machines have increased, this type of oscillating cradle mechanism has become obsolete since it is not capable of reorienting bottles at the required speeds without excessive breakage. In my copending U.S. application Ser. No. 660,760, filed Aug. 15, 1967, for "Glass Bottle Handling Apparatus," I have disclosed an improved bottle handling mechanism which is capable of transporting and reorienting bottles at the high speeds required by modern automatic machines and processes. This bottle handling mechanism operates on the principle of a continuously rotating vacuum wheel operable to engage the bottom of bottles as they come off of the first conveyor and transfer them through 90° of rotation onto a second conveyor, thereby effecting the reorientation.

The bottle letdown mechanism of this invention operates on still another principle for effecting the orientation of the bottle. Specifically, it contemplates a series of guide rods which convert the bottles from an upright to a horizontal position as the bottles are pushed through the rods to a metering outlet. This outlet then cooperates with pockets defined by spacers on the decorating machine conveyor to deposit one horizontally positioned bottle in each pocket of the conveyor.

The primary advantage of this invention over my earlier vacuum wheel type of letdown mechanism resides in the decreased cost of manufacture and operation effected by this improved letdown mechanism.

Other objects and advantages of this invention will be more readily apparent from the following description of the drawings in which:

FIGURE 2 is a perspective view similar to FIGURE 1 but with the bottles and the bottle decorating machine removed.

FIGURE 3 is a front elevational view, partially broken away, of the letdown mechanism of FIGURE 1.

FIGURES 4 and 5 are consecutive cross-sectional views of a portion of the letdown mechanism illustrating the manner in which bottles are metered out of the letdown mechanism onto the output conveyor.

Figure 1:
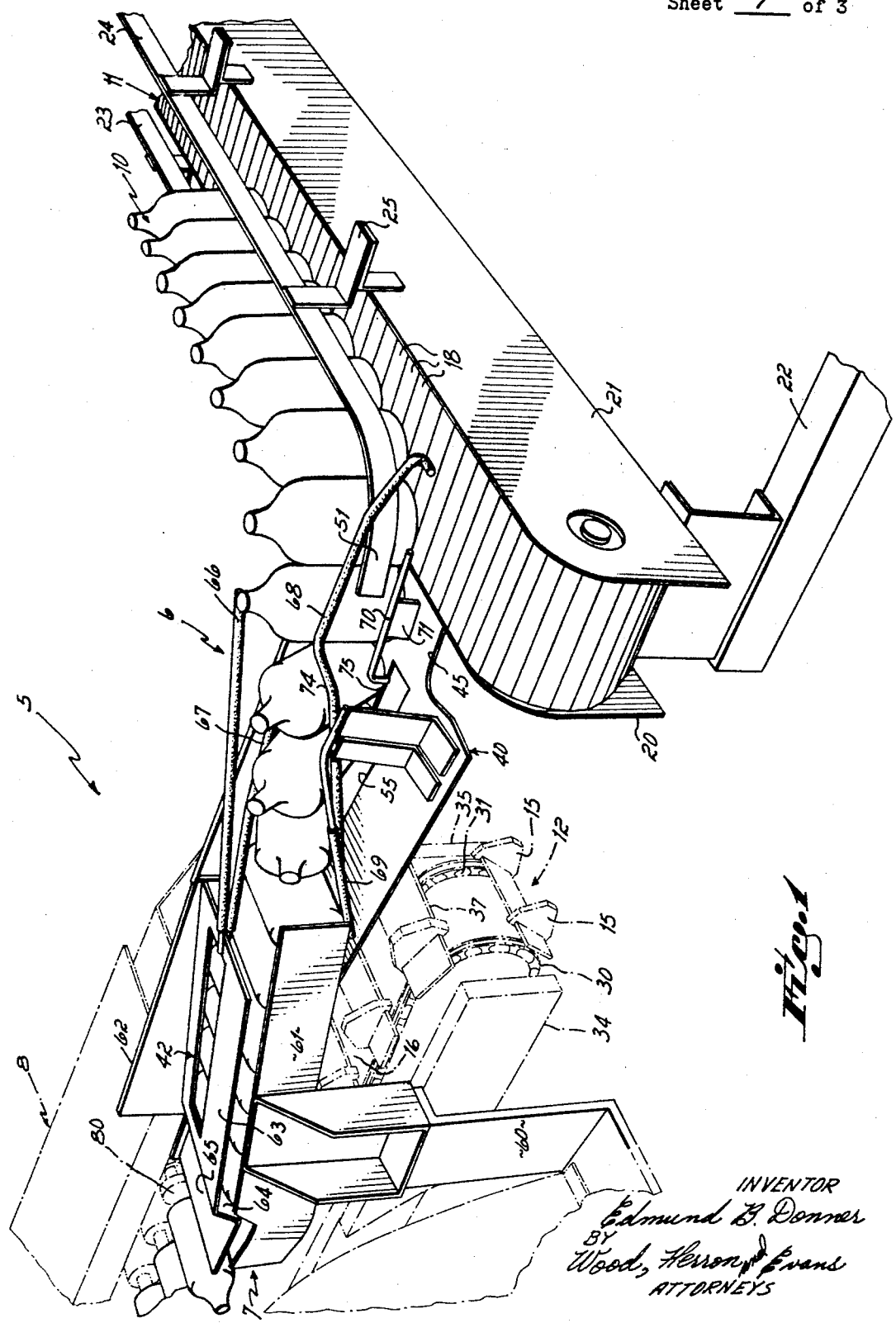
FIGURE 1 is a perspective view of the bottle letdown mechanism of this invention illustrated as supplying bottles to a bottle decorating machine, the bottle decorating machine being shown in phantom for purposes of clarifying the drawings.

Generally, the letdown mechanism of this invention is operable to convert a continuous stream of upright bottles 10 on an infeed conveyor 11 into a spaced stream of horizontally positioned bottles on an output conveyor 12. This conversion or reorientation of the bottles 10 occurs as the bottles pass through the letdown mechanism 5 and are forced by a series of guide rods 6 to rotate through 90° from an upright position into a horizontal position. Once located in the horizontal position, the bottles are metered through a metering exit 7 cooperable with spacers 15 on the output conveyor 12 to meter the bottles 10 one at a time into pockets 16 defined between the spacers 15.

The output conveyor 12 is, in the preferred embodiment, operable to supply bottles 10 in a horizontal position to the infeed conveyor of a bottle decorating machine 8. This machine 8 is completely illustrated and described in copending application Ser. No. 660,799, filed Aug. 15, 1967, for "Method and Apparatus for Decorating Ware," and assigned to the assignee of this application. For purposes of illustrating a preferred environment of use of this invention, the complete disclosure of that application is hereby incorporated by reference.

In the decorating machine 8 the bottles 10 are chucked while located in a horizontal position with the axes of the bottles in a horizontal plane and, while so supported, are rotated relative to a stencil so as to effect placement of a decorating medium or paint onto the bottles. In that machine, as in nearly all commercial bottle decorating machines, the bottles must be located horizontally for application of the decorating medium. The letdown mechanism 5 of this invention effects the letdown from the vertical or upright position—in which the bottles are transported through a bottle manufacturing plant—to a horizontal position in which the bottles are customarily placed for decorating.

The infeed conveyor 11 is a conventional conveyor for transporting bottles in an upright position throughout a glass bottle manufacturing facility. It comprises an endless chain of articulately interconnected plates 18 movable over a drive roller (not shown) at the front end of the conveyor and an idler roller (not shown) at the rear of the conveyor. The rollers are rotatably supported from side frame plates 20, 21 which are in turn mounted upon a frame base 22. To maintain the bottles on the conveyor, guide rails 23, 24 extend along the sides of the conveyor and are secured to the frame side plates 20, 21 by brackets 25 which extend between and are welded to the side plates 20, 21 and the rails 23, 24. Bottles 10 are transported on the continuously moving conveyor 11 as a consequence of friction between the top surface of the plates 18 of the conveyor 11 and the bottoms of the bottles. In the event of a blockage to the flow of the bottles on the conveyor 11 or of a slowdown of a conveyor in front of the infeed conveyor 11, the bottles slide over the surface of the plates 18 while the conveyor 11 continues to move at a fixed speed.

The output conveyor 12 comprises a pair of continuously moving parallel endless chains 30, 31 supported at their rear or upstream end upon idler sprockets 32. These sprockets 32 are supported for rotation upon an idler shaft 33 rotatably mounted in frame plates 34, 35 of the decorative machine. At their forward or downstream end, the endless chains 30, 31 are supported by drive sprockets (not shown) which are driven from the drive mechanism of the decorating machine 8 so that the output conveyor 12 is synchronized with the drive of the other conveyors of the decorating machine.

Spacer support plates 37 extend between and are connected to lugs 38 which are pivotally secured to links of chains 30, 31. These plates support the spacer lugs 15 for movement on the conveyor 12 and are spaced apart a predetermined distance so that the generally triangularly shaped spacers 15 on adjacent platforms 37 define pockets 16 of a width approximately the diameter of a bottle 10.

The letdown mechanism 5 comprises a bottom support plate 40, the network or series of guide rods 6, and an upper metering plate 42 of the metering exit 7. Support plate 40 extends from adjacent the downstream end of the infeed conveyor 11 to and over the upstream end of the output conveyor 12. It comprises a horizontal platform section 48 and a lower inclined ramp section 49.

An intermediate or spanner plate 45 extends across the gap between the upstream end of the support plate 40 and the top 47 of the side plate 20 of the infeed conveyor 11 and serves as a supporting surface for the bottles 10 as they are pushed from the infeed conveyor 11 onto the upstream end of the supporting paltform 40. In moving across the spanner platform 45, the bottles are guided by the arcuately bent downstream ends 50, 51 of the guide rails 23, 24, respectively. These arcuately bent ends extend over the intermediate spanner platform 45 so that the bottles 10 located behind those bottles on the platform 45 force the bottles across the intermediate platform onto the upstream or generally horizontal section 48 of the platform 40 and subsequently across this horizontal section toward the downwardly inclined ramp section 49.

A generally rectangular relief slot 55 is cut from the platform 40 and extends parallel to the direction of movement of the bottles over the platform 40. This slot 55 serves as a relief area for the reception of the heel 75 of bottles 10 as the bottles are tipped over the network of guide rods, as is explained more fully hereinafter.

The letdown mechanism is carried upon and supported from the frame of the bottle decorating machine by vertical frame posts 60, the upper ends of which are welded to side plates 61, 62 of the letdown mechanism 5. Bottom support plate 40 extends between and is welded to these side plates 61 and 62.

The bottle metering plate 42 has an upper section 63 which extends parallel to, but is spaced from the inclined ramp section 49 of the bottom support plate 40. At its lower end, the metering plate 42 is bent first downwardly and forwardly so as to define an angle A of approximately 140° with the upper section 63 of the metering plate and then forwardly so as to define at an angle B of approximately 120° between an end section 65 and an intermediate section 64.

The network of guide rods 6 which effects the tipping or rotating of the bottles through 90° from an upright to a horizontal position comprises six different rods 66, 67, 68, 69, 70 and 77 which extend generally in the direction of movement of the bottles over the platform 40. The network of guide rods are preferably covered with nylon tubing or the like to protect the bottles from breakage.

The lowermost one of these guide rods 70 is secured to the spacer platform 45 by a mounting block 71. This rod 70 serves as a trip rod over which the bottles fall when the rear of the necks of the bottles engage the uppermost one 66 of the guide rods and are forced forwardly. In other words, the upper guide rod 66 is contacted by the necks of the bottles as the bottles move downstream on the platform conveyor. This rod 66 then forces the bottles to fall over or tip over the lower trip rod 70. Upon continued forward movement of the bottles and after the tipping movement has been initiated by contact of the bottles with the upper rod 66, the rear of the bottles contact a second lower guide rod 67 which then forces the bottles to fall over the rod 70 into an arcuate cradle section 74 of the support rod 68 on the front side of the bottles so that the bottles are then supported from this rod 68. As the bottles tip over and fall into the cradle section 74 of the rod 68, the heels 75 of the bottles enter the relief slot 55 in the bottom support plate 40. This slot 55 allows the bottles to tip over without rocking on or falling over the heel 75 of the bottles. As the bottles then continue to move forwardly between the guide rods, they engage the second front support rod 69 which upon continued forward movement, allows the necks of the bottles to be lowered toward the platform while the bottoms of the bottles slide within the relief slot 55. As the bottles near a horizontal position, the bottoms of the bottles come up out of the relief slot 55 and are engaged by the lower guide rod 77 on the back side of the bottles. This lower guide rod 77 then precludes the bottles from sliding off the rear of the platform. The horizontally positioned bottles then enter the downwardly inclined ramp between the lower inclined section 49 of the bottom support platform 40 and the upper inclined holddown portion 63 of the metering plate 42.

As may be seen most clearly in FIGURE 2, the rear guide rods 66, 67 are welded at their downstream ends to the metering plate 42 while the lowermost rear rod 77 is welded to the side plate 62. The front guide rods 68 and 69 are supported at their downstream ends by the support plate 40 and at their upstream ends by L-shaped brackets 72 and 73 which are welded to the top of the same support plate 40.

As may be seen most clearly in FIGURES 4 and 5, the rate at which the bottles pass out of the letdown mechanism is controlled by the rate of movement of the output conveyor 12. The clearance between the tops 76 of the spacers 15 on the output conveyor 12 and the bottom leading edge corner 78 of the metering plate 42 is less than the diameter of a bottle so that the bottles can only pass out of the metering exit 7 one at a time when a pocket 16 defined by adjacent spacers is located beneath the exit. Since only one bottle 10 fits within each pocket 16, a bottle contained within a pocket is operable to restrain and prevent the next following bottle 10a from entering the same pocket 16. When a blocking bottle 10b moves forwardly on the conveyor, the following spacers 15A on the rear side of the bottles 10b block the next following bottles 10a from falling out of the letdown mechanism exit 7 until the next following pocket 16A is located beneath the exit 7. As may be seen in FIGURE 5, when this condition obtains the next following bottle 10a falls from the exit into the pocket 16A.

*Operation*

Bottles are supplied in a continuous stream 10 to the letdown mechanism 5 on the input conveyor 11. The rate at which bottles move through the letdown mechanism 5 and onto the output conveyor 12 is less than the speed of the input conveyor 11 so that the bottles on the input conveyor are constantly sliding over the surface of the conveyor and pushing those bottles in the letdown mechanism 5 through that mechanism.

As the bottles pass off the input conveyor 11 and are forced over the spacer or spanner plate 45, the necks of the bottle contact the upstream end of a guide rod 66 which forces the bottles to trip or fall over the lower guide support rail 70. Upon further continued movement through the letdown mechanism, the cylindrical body section of the bottle is engaged by the upstream end of an intermediate guide rod 67 which then forces the bottle to fall over the end of the trip rod 70 into an arcuate cradle 74 of the front guide rod 68. As the bottles fall into the cradle section 74 of the guide rod 68, the heel 75 of the bottles enter the relief slot 55 in the bottom support plate 40. Upon continued forward movement of the bottles through the guide rods 6, the bottles are lowered into a horizontal position while contacting a front support rod 68 and then finally a lower front support rod 69.

Once located in the horizontal plane, the bottles roll down the inclined ramp defined by the forward section 49 of the bottom support plate 40 to the exit 7 defined by the forward edge of the support plate 49 and the generally Z-shaped end section 64, 65 of the metering plate 42. The metering plate than cooperates with the spacers 15 on the output conveyor 12 to drop or meter one bottle into each pocket 16 of the output conveyor as the pockets pass beneath the exit 7. The output conveyor 12 then transports the bottle in a horizontal position to the chucks 80 of the bottle decorating machine 8.

While only a single preferred embodiment of my invention has been illustrated and described herein, those persons skilled in the arts to which this invention pertains will readily appreciate numerous changes and modifications which may be made without departing from the spirit of my invention. Therefore, I do not intend to be limited except by the scope of the appended claims.

Having described my invention, I claim:

1. A bottle letdown mechanism for converting a continuous stream of upright bottles into a stream of horizontally positioned bottles spaced a predetermined distance apart, said mechanism comprising
a continuously moving input conveyor for transporting bottles in a continuous stream to a letdown station, said bottles while on said input conveyor being located in contact with the adjacent bottles and being located in an upright position with the axes of the bottles in a vertical plane,
a continuously moving output conveyor having a plurality of spacers attached thereto, said spacers being operable to define bottle receiving pockets therebetween, said bottles when located in said pockets being spaced apart by said spacers and positioned horizontally with the axes of the bottles in a horizontal plane, and
stationary guide means for supporting said bottles during movement between said conveyors, said guide means having an input end located adjacent said input conveyor for receiving said upright bottles and an output end located adjacent said output conveyor for dropping said horizontally positioned bottles onto said output conveyor, said guide means between said ends being operable to tip said upright bottles over into a horizontal position, and said guide means including a stationary metering plate located at said output end and cooperable with the upper ends of said spacers to meter one horizontally positioned bottle into each pocket between said spacers as the pockets pass beneath the output end of said guide means.

2. The letdown mechanism of claim 1 wherein said guide means includes a lower support plate, said plate having a relief therein for receiving the bottom edge of the bottles as the bottles are tipped over from the upright to the horizontal positions.

3. The letdown mechanism of claim 2 wherein said lower support plate has an output end spaced from and cooperable with said metering plate to define a throat through which the bottles pass into said pockets of said output conveyor.

4. The letdown mechanism of claim 1 wherein said infeed conveyor is a friction feed conveyor having a relatively smooth top surface, said infeed conveyor being operable at a linear speed which is capable of supplying bottles to said output conveyor faster than said output conveyor transports said bottles away from said infeed conveyor so that a reservoir of bottles is maintained on said infeed conveyor, said reservoir of bottles being operable to force bottles through said guide means as the bottles slide over the surface of said infeed conveyor.

5. In combination, a bottle decorating machine and a bottle letdown mechanism for supplying bottles in a horizontal position to said decorating mechanism, said bottle letdown mechanism being operable to convert a continuous stream of upright bottles into a stream of horizontally positioned bottles spaced a predetermined distance apart, said mechanism comprising
a continuously moving input conveyor for transporting bottles positioned vertically on said input conveyor, an output conveyor having a plurality of spacers attached thereto, said spacers being operable to define bottle receiving pockets therebetween, said bottles when located in said pockets being spaced apart by said spacers and positioned horizontally with the axes of the bottles in a horizontal plane, and
stationary guide means for supporting said bottles during movement between said conveyors, said guide means having an input end located adjacent said input conveyor for receiving said upright bottles and an output end located adjacent said output conveyor for dropping said horizontally positioned bottles onto said output conveyor, said guide means between said ends being operable to tip said upright bottles over into a horizontal position, and said guide means including a stationary metering plate located at said output end and cooperable with the upper ends of said spacers to meter one horizontally positioned bottle into each pocket between said spacers as the pockets pass beneath the output end of said guide means.

6. The combination of claim 5 wherein said guide means includes a lower support plate, said plate having a relief therein for receiving the bottom edges of the bottles as the bottles are tipped over from the upright to the horizontal position.

7. The combination of claim 6 wherein said lower support plate has an output end spaced from and cooperable with said metering plate to define a throat through which the bottles pass into said pockets of said output conveyor.

8. The combination of claim 5 wherein said infeed conveyor is a friction feed conveyor being operable at a linear speed which is capable of supplying bottles to said output conveyor faster than said output conveyor transports said bottles away from said infeed conveyor so that a reservoir of bottles is maintained on said infeed conveyor, said reservoir of bottles being operable to force bottles through said guide means as the bottles slide over the surface of said infeed conveyor.

References Cited
UNITED STATES PATENTS 1,574,430    2/1926    Lemon _____ 198—33 X EDWARD A. SROKA, *Primary Examiner.*

U.S. Cl. X.R.

198—33